Jan. 3, 1939.   F. A. WALKER ET AL   2,142,929
WASHING APPARATUS
Filed June 20, 1936   3 Sheets-Sheet 1
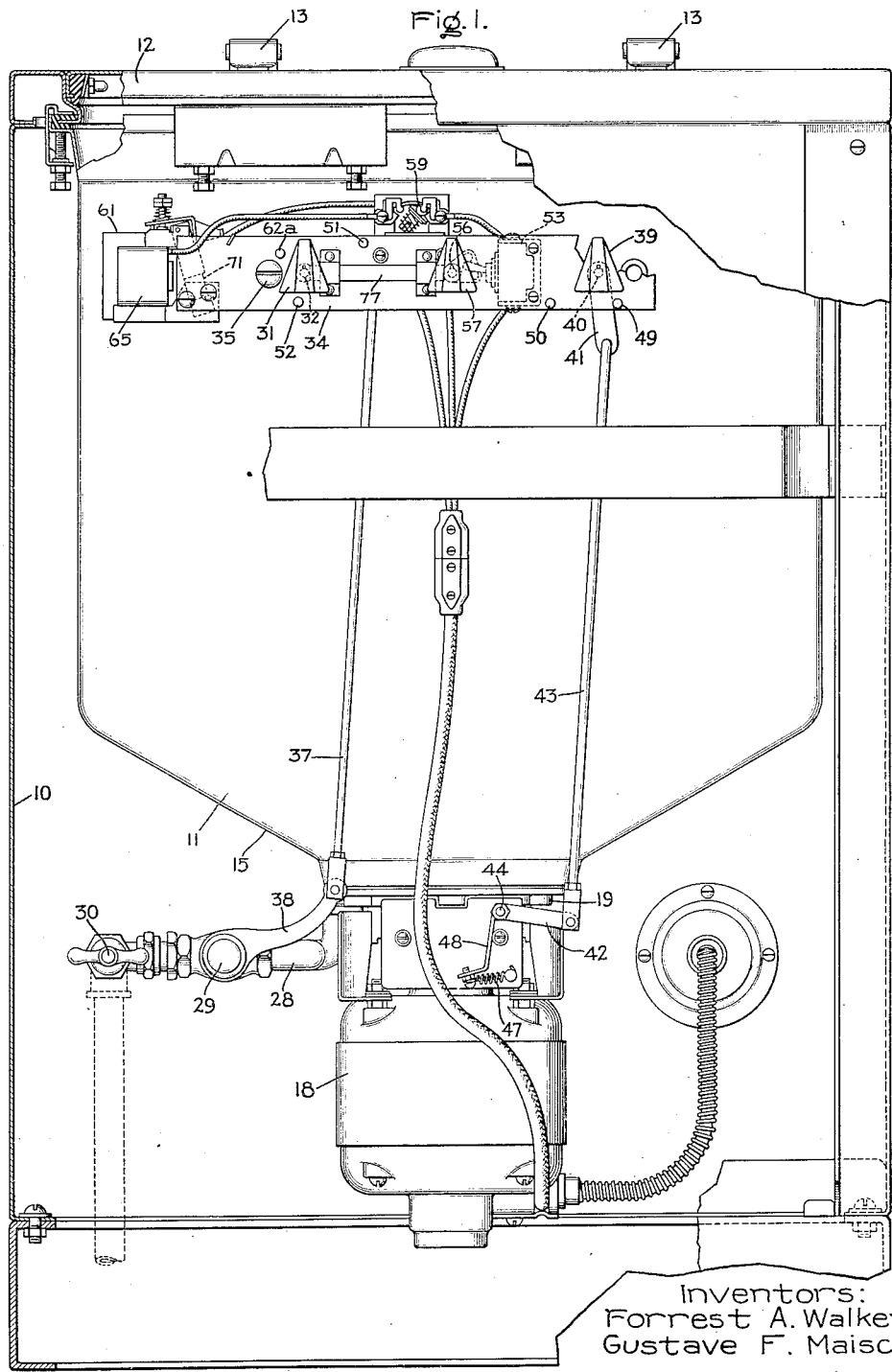
Inventors:
Forrest A. Walker,
Gustave F. Maisch,
by Harry E. Dunham
Their Attorney.

Jan. 3, 1939.  F. A. WALKER ET AL  2,142,929
WASHING APPARATUS
Filed June 20, 1936  3 Sheets-Sheet 2
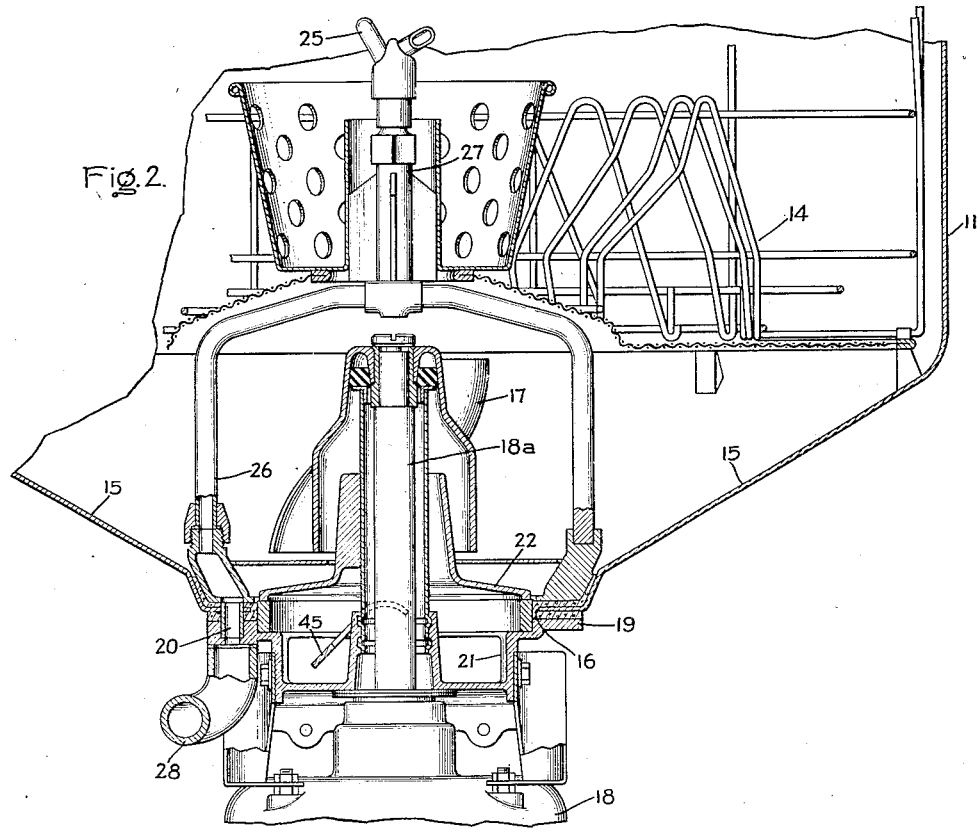
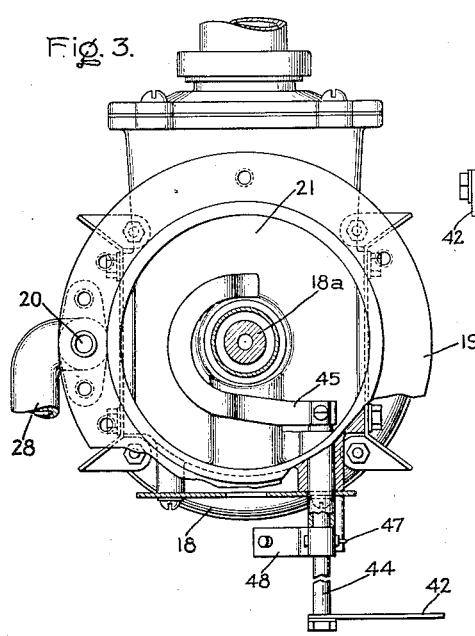
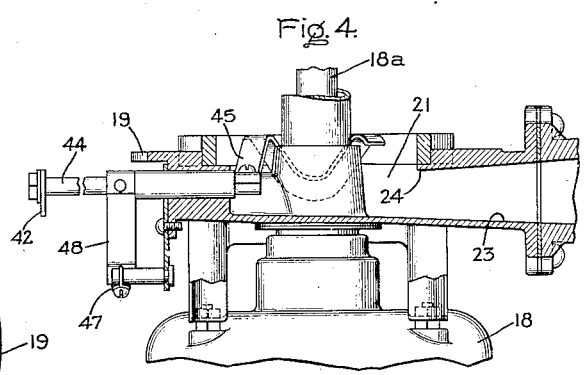
Inventors:
Forrest A. Walker,
Gustave F. Maisch,
by Harry E. Dunham
Their Attorney.

Jan. 3, 1939.   F. A. WALKER ET AL   2,142,929
WASHING APPARATUS
Filed June 20, 1936   3 Sheets-Sheet 3
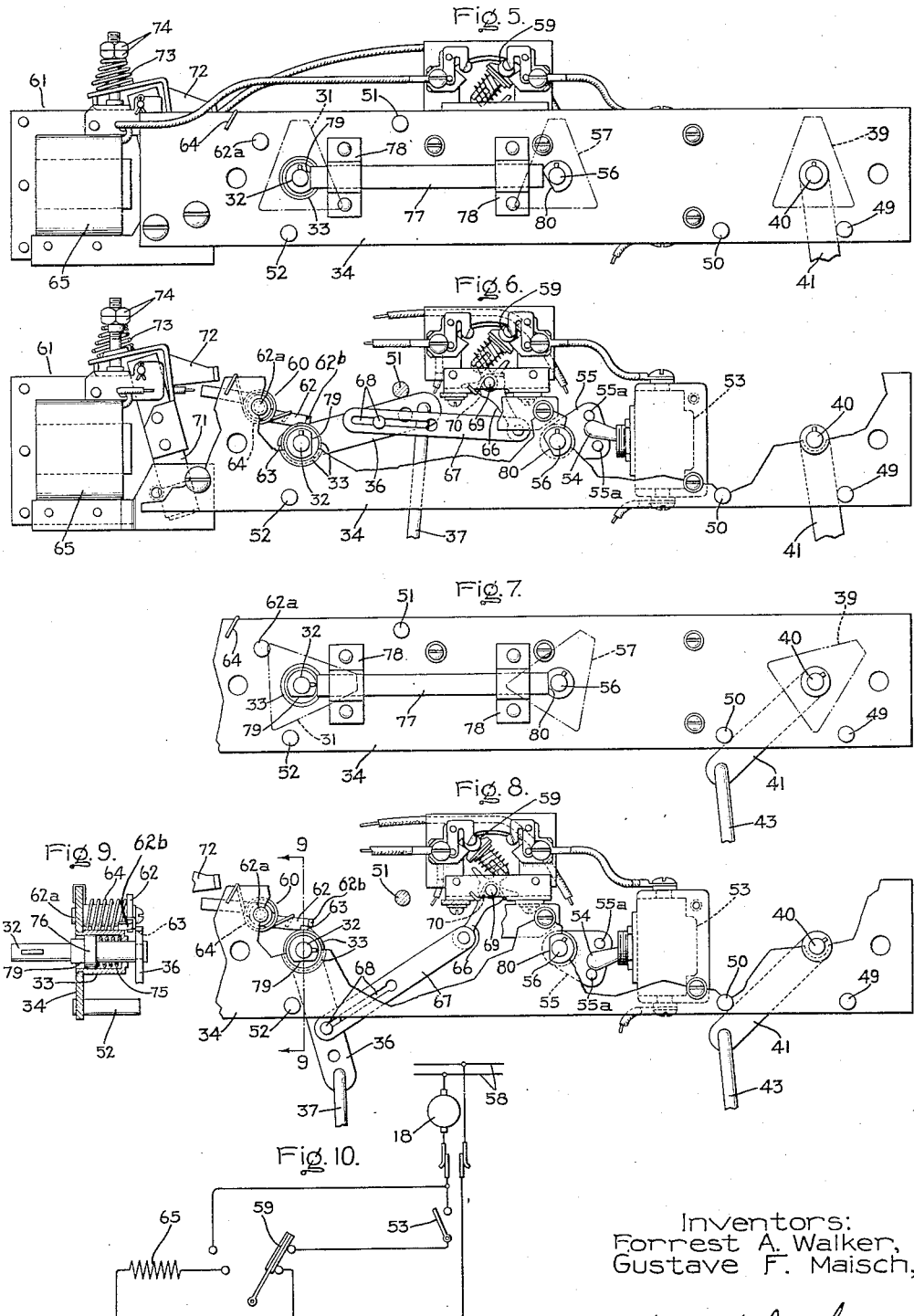
Inventors:
Forrest A. Walker,
Gustave F. Maisch,
by Harry E. Dunham
Their Attorney.

Patented Jan. 3, 1939

2,142,929

UNITED STATES PATENT OFFICE 2,142,929

WASHING APPARATUS

Forrest A. Walker, Oak Park, and Gustave F. Maisch, Chicago, Ill., assignors to Edison General Electric Appliance Company, Chicago, Ill., a corporation of New York Application June 20, 1936, Serial No. 86,396

14 Claims. (Cl. 141—9)

This invention relates to washing apparatus, more particularly to household dishwashing apparatus, and it has for its object the provision of improved apparatus of this character.

This invention has particular application to dishwashing apparatus wherein a cleansing liquid, such as hot water, is circulated in the washing vat through dish supporting racks by means of suitable power driven means, such as a motor driven impeller.

In one of its aspects, this invention contemplates the provision of improved control means for washing apparatus of the above character including means for automatically supplying the washing vat with a predetermined quantity of cleansing liquid.

In accordance with this invention, in one form thereof, suitable manually operable control means are provided for the impeller motor and for the liquid supply valve. Means are provided for latching the liquid supply valve in its open position when it has been moved to this position by the manually operable control member, and further, for automatically releasing the locking means to permit the valve to close when the load imposed on the impeller motor in circulating liquid in the vat attains a predetermined magnitude. In other words, the valve is permitted to close when a predetermined quantity of liquid has been supplied to the vat.

Moreover, suitable interlocking means are provided between the control means for the supply valve and motor so that liquid cannot be supplied to the vat unless the motor is energized to operate its impeller. The interlocking means is further so arranged that the motor cannot be de-energized while liquid is being supplied to the vat. Thus, the interlocking means is so arranged that it is possible to supply only the proper quantity of liquid desired in the vat for a washing operation.

For a more complete understanding of this invention, reference should be had to the accompanying drawings in which Fig. 1 is a vertical elevation of dishwashing apparatus embodying this invention, portions being shown in section and parts being broken away so as to illustrate certain details of construction; Fig. 2 is an enlarged fragmentary sectional view of a portion of the apparatus shown in Fig. 1; Fig. 3 is a fragmentary plan view of a portion of the apparatus shown in Fig. 2, portions being broken away and shown in section so as to illustrate certain details of construction; Fig. 4 is a sectional view taken through a portion of the apparatus shown in Fig. 3; Fig. 5 is an enlarged elevation illustrating a portion of the control apparatus of the apparatus of Fig. 1; Fig. 6 is a view similar to Fig. 5, but having parts broken away so as to illustrate certain details of construction; Fig. 7 is a fragmentary view illustrating a portion of the control apparatus of Figs. 5 and 6 but illustrating certain parts in different operative positions; Fig. 8 is a fragmentary view of a portion of the control apparatus of Figs. 5 and 6, but illustrating certain of the controlling elements in different operative positions; Fig. 9 is a sectional view taken through the line 9—9 of Fig. 8 and looking in the direction of the arrows; and Fig. 10 is a diagrammatic view illustrating a certain control apparatus for the impeller driving motor arranged in accordance with this invention.

Referring to the drawings, this invention has been shown in one form as applied to dishwashing apparatus comprising a casing or cabinet 10 enclosing a suitable washing vat or chamber 11. Both the casing 10 and the vat 11 have a substantially square rectangular cross-section, but it is to be understood that they may be circular or have any other suitable shape. The vat 11 is provided with a suitable cover 12 which may be elevated on hinges 13 whereby access can be had to the interior of the vat. The casing 10, the vat 11 and the cover 12 preferably will be formed from a suitable rust-resisting steel, which will be plated or enameled.

It is to be understood that suitable removable dish supporting openwork baskets or racks will be provided in the lower and upper portions of the vat. Only the lower rack 14 is shown (Fig. 2). This rack and also the upper rack which cooperates with it preferably will be of the construction described and claimed in the United States Patent No. 2,035,625 to Forrest A. Walker, dated March 31, 1936.

The bottom wall of the vat 11, as shown, is provided with inclined walls 15 which slope downwardly toward the center of the bottom of the vat and terminate in an opening 16 arranged centrally of the vat.

In the lower portion of the vat 11 above the opening 16 is a suitable impeller 17 arranged to rotate on an axis substantially coaxial with the central vertical axis of the vat and the opening 16. The impeller 17 is operated by means of an electric motor 18 mounted below the bottom wall of the vat and having its shaft 18a extending through the opening 16 and operably connected with the impeller. The motor 18 is supported by a metallic frame 19, which is mounted below the bottom wall of the vat, as shown in Figs. 1 and 2.

The frame 19, as shown, is provided with an inlet or fresh cleansing liquid supply conduit 20, and also with an internal chamber 21 constituting a drain chamber. Arranged within the vat above the drain chamber 21 is a drain valve 22. The drain chamber 21 communicates with a drain conduit 23 through a lateral port 24 (Fig. 4). The arrangement of the frame 19 supporting the motor and provided with the liquid supply and drain passageways together with the arrangement of the drain valve 22 and its associated structure are substantially the same as described and claimed in the United States Patent to Karl K. Huppman No. 2,022,637, dated November 26, 1935.

The passageway 20 communicates with the vat 11 through a suitable reaction spray device 25 by means of conduits 26 and 27 in the vat. The reaction spray device and conduits supplying liquid thereto are substantially the same as described and claimed in United States Patent to Jesse H. Clark No. 2,025,571, dated December 24, 1935.

A conduit 28 connected with a suitable source of cleansing liquid supply, such as a hot water tank (not shown) is connected with the supply passageway 20. The supply of water to the vat is controlled by means of a suitable valve 29. A second valve 30 is provided in the supply conduit, but this valve normally will be in its open position, the control of the water to the vat normally being controlled solely by the valve 29. The valve 29 is of the self closing type. That is, when the valve has been opened and released, it will move to its closed position automatically. The valve is provided with a spring (not shown) which functions to move it to its closed position.

The liquid supply valve 29 is moved to its opened position by means of a manually operable control knob 31. This knob 31 is keyed to an operating shaft 32 which is rotatably mounted in a bearing 33 provided for it in a control panel 34. The control panel 34 preferably will be formed of a rigid sheet of metal that is detachably secured to the vat in any suitable manner, as by means of screw fastening means 35 (Fig. 1). Also rigidly secured to the shaft 32 is a lever 36. The lever 36 is connected by means of a link 37 with an operating lever 38 for the valve 29. The parts are so aranged that when the knob 31 is moved in a clockwise direction as viewed in the drawings, from its position shown in Figs. 1 and 5 to its position shown in Fig. 7, it will operate the lever 38 to open the valve 29, whereas when it is returned to its position shown in Figs. 1 and 5, it will permit the valve to move to its closed position.

The drain valve 22 is operated by means of a suitable control knob 39 similar to the knob 31. The knob 39 is rigidly secured to an operating shaft 40 also mounted in the control panel 34. An operating lever 41 is rigidly secured to the shaft 40, and is connected to a lever 42 by means of a link 43. The lever 42 operates a shaft 44 which extends into the drain chamber 21 where it operates a U-shaped lever 45 which is disposed beneath the drain valve 22, as clearly shown in Figs. 2, 3 and 4. The U-shaped lever 45 when elevated engages the drain valve 22 to elevate it and thereby permit the vat to drain into the chamber 21. The parts are so arranged that when the knob 39 occupies its position shown in Figs. 1 and 5, the drain valve will be held in its open position, that is, the U-shaped member 45 will be elevated to hold the valve open. In this position of the knob, it will be observed that the lever 41 and the link 43 are slightly off center so that the drain valve is mechanically held in its open position. When the knob 39 is moved in a clockwise direction from its position shown in Figs. 1 and 5 to its position shown in Fig. 7, it moves the lever 41 in a clockwise direction which operation moves the lever 42 in a counter-clockwise direction. This movement of the lever 42 lowers the U-shaped lever 45 thereby permitting the drain valve to move to its closed position by gravity. Movement of the valve to its closed position is assisted by means of a tension spring 47 having one end anchored, as shown, and its opposite end secured to a lever 48 which is rigidly secured to the shaft 44. When the knob is in its position shown in Figs. 1 and 5 and the drain valve is open, the lever 41 bears against a suitable stop 49 carried by the panel 34. A similar stop 50 is provided on the panel for limiting the movement of the lever 41 in a clockwise direction when the knob 39 is moved to close the drain valve. Similar stops 51 and 52 are provided on the panel 34 to limit the movement of the lever 36 in its valve closing and opening directions respectively.

The energization of the impeller driving motor 18 is controlled by means of a switch 53 which preferably will be of the snap action type. The switch 53 is provided with an operating lever 54. The operating lever 54 is moved between its controlling positions by means of a plate-like lever 55 which is rigidly secured to a shaft 56 that is mounted in the control panel 34, and which has spaced pins 55a arranged to engage the lever 54. Rigidly secured to the shaft 56 is a manually operable control knob 57. The parts are so arranged that when the knob 57 is moved in a clockwise direction from its position shown in Figs. 1 and 5 to its position shown in Fig. 7, it will operate the switch 53 to energize the motor 18; when it is returned to its position shown in Figs. 1 and 5, it will operate the switch to deenergize the motor. As shown diagrammatically in Fig. 10, the impeller motor is energized from a suitable source of electrical supply 58 through the switch 53.

Also connected in the motor circuit is a snap switch 59 which normally occupies its position shown in Figs. 5, 6 and 10 to complete the motor circuit, as clearly shown in Fig. 10. The switch 59 is part of the control provided to measure a predetermined quantity of water for the vat 11.

This control means further includes a latching device 60 for locking the inlet valve in its open position and an electromagnetic device 61 for releasing the valve when the motor load attains a predetermined magnitude. The latching device 60 comprises a latch 62 mounted on a shaft 62a which in turn is mounted in the panel 34. The latch 62 cooperates with a tooth 63 formed on the lever 36 and is biased in a clockwise direction, as viewed in Figs. 6 and 8, to engage the tooth by means of a spring 64. The parts are so arranged that when the knob 31 is moved to its position shown in Fig. 7 to open the inlet valve, the latch 62 engages the tooth 63 to lock the valve in its open position. When the knob 31 is in its position of Fig. 1, the lever 36 is in its position of Fig. 6 and the latch 62 rests upon the bearing 33 which acts as a stop; as shown, the latch is provided with an inturned end 62b arranged to engage the bearing directly.

When the knob 31 is thus moved to open the inlet valve 29, it also operates the snap action switch 59 to a second controlling position shown in Fig. 8, in which position, the motor circuit is connected through the energizing coil 65 of the electromagnetic device 61. In other words, when the valve is opened the switch is moved from its position shown in Fig. 10 to its opposite position to close its opposite set of contacts so that the motor armature circuit is connected directly through the coil 65. For this purpose, the lever 36 is mechanically connected to the operating lever 66 of the switch 59 by means of a link 67. As shown, the link 67 is pivotally secured at one end to the switch operating lever 66 and at its opposite end is connected to the lever 36 by a pin and slot connection 68. The parts are so arranged that when the knob 31 is moved to open the valve 29, the lever 36 operates the lever 66 through the link 67 to move the snap-action switch from its position shown in Figs. 1, 5, 6 and 10 to its position shown in Fig. 8, which operation, as pointed out previously, connects the motor circuit through the coil of the electro-magnet.

The lever 66, as shown, is mounted on a shaft 69 and when it moves back and forth on this shaft snaps the switch between its controlling positions. The lever 66 is biased to its position shown in Figs. 1, 5, 6 and 10 by means of a spring 70 mounted on the shaft 69. This spring therefore also biases the inlet valve controlling lever 36 to its position shown in these figures and the inlet valve to its closed position. It is the function of the latch 62 to lock the inlet valve in its open position against the force of the spring 70 and the spring in the inlet valve.

As pointed out previously, operation of the knob 31 to move the inlet valve to its open position also operates the switch 59 to connect the motor circuit through the operating coil 65 of the electromagnetic device. At a predetermined value in the excitation of the coil, the electromagnetic device releases the lever 36 to permit the inlet valve to be closed by its spring and the spring 70. As shown, the armature 71 of the electromagnet is provided with an extension 72 arranged when the armature is attracted by its magnet to engage the free end of the latch 62 to move the latch in a counterclockwise direction and thereby release the lever 36. Movement of the armature 71 to its retracted position is opposed by means of a compression spring 73. The compression of the spring can be adjusted by means of nuts 74 so that the opposing force can be adjusted and thereby the value in the excitation of the electromagnet 65 at which the latch is released.

In the operation of the device thus far described, it will be understood that when the parts are in their positions shown in Figs. 1, 5 and 6, the inlet valve 29 will be closed, the motor 18 will be deenergized and the drain valve 22 will be in its open position. If it be desired to wash dishes, the dishes will be loaded in their respective racks in the vat and the cover 12 will be closed. The drain valve knob 39 will then be moved from its position of Figs. 1, 5 and 6 to its position of Fig. 7 to effect the closure of the drain valve. The motor operating knob 57 will then be moved from its position shown in these figures to its position shown in Fig. 7 to operate the switch 53 to energize the impeller motor which thereupon will operate the impeller 17. Then the inlet valve knob 31 will be moved to its position of Fig. 7, which operation, as previously pointed out, will open the supply valve 29. At the same time, it will operate the snap switch 59 from its position of Figs. 1, 5 and 6 to its position of Fig. 8 to connect the motor armature circuit through the electromagnetic device 61. It will also effect the operation of the latching device 60 to hold the inlet valve open against the force of the closing spring in the inlet valve and the spring 70. Under these conditions, the water which flows into the vat will accumulate in the vat and will be engaged by the impeller 17 and hurled upwardly through the dish supporting trays. As the water continues to flow into the vat, the load imposed on the impeller and hence on its driving motor 18 will gradually increase. This of course, will increase the armature current of the motor and hence the excitation of the operating coil 65 of the electromagnet. Eventually when a predetermined quantity of water has been supplied to the vat, the excitation of the electromagnetic device 61 will have attained a predetermined value at which it will attract its armature 71. This operation, as previously pointed out, releases the latch 62 and permits the inlet valve 29 to close and the snap switch 59 to return to its initial position. The amount of water permitted to flow into the vat can be varied by adjusting the spring 73.

The dishwasher will then function to wash the dishes and will continue to do so until the motor knob 57 is operated to deenergize the motor, or until the drain valve knob 39 is operated to open the drain valve. The first operation, of course, will stop the impeller, while the latter will drain the vat.

While the vat is being supplied with water, it is sometimes desirable to stop the operation of the device. For this purpose, we have provided means for manually releasing the inlet valve 29 before it has been released by operation of the electromagnet 65. For this purpose, the bearing 33 provided for the shaft 32 and the supply valve knob 31 has a cup shape, as shown in Fig. 9. Arranged within the cup bearing is a compression spring 75 which bears on a collar 76 provided on the shaft so as to hold it in its normal operative position. In this position, the latching device 60 can function as previously described. The spring, however, resiliently holds the shaft in this position so that it can be depressed by manual operation of the knob 31. As shown in Fig. 9 depression of the knob moves the lever 36 inwardly of the latching member 62 to cause the latching member to disengage the tooth 63. This, of course, releases the inlet valve 29 and permits it to be moved to its closed position. As before, the switch 59 will at the same time return to its initial position of Figs. 1, 5 and 6. As the inlet valve moves to its closed position, the lever 36 is moved axially to its position of Fig. 6 and moreover is moved forwardly to its normally operative position by the spring 75 acting on shaft 32. The lever can move forwardly because the latch 62 is held out of the path of movement of the lever by the engagement of the inturned end 62b of the latch with the bearing 33, as previously described.

Suitable interlocking means are provided between the water supply valve and motor control knobs 31 and 57 so that the supply valve knob 31 cannot be operated to permit liquid to flow to the vat unless the motor knob has been operated to energize the motor 18 to operate the impeller, and moreover, the motor knob cannot be moved to deenergize the motor as long as the supply valve knob 31 is in its position wherein the supply valve is open. The interlocking means comprises a slide bar 77 mounted upon the panel 34 by means of a pair of clips 78. Each of the shafts 32 and 56 is provided with flat portions 79 and 80 respectively, which cooperate with the opposite ends of the slide bar 77, as shown in Figs. 5-8 inclusive. The parts are so arranged that when the knobs are in their initial positions shown in Figs. 1, 5 and 6 the left-hand end of the bar 77 will bear against the flattened portion 79 and its opposite end will bear against the larger diameter of the shaft 56. The parts are so arranged and the length of the bar 77 is such that when the members are in these positions, it will be impossible to operate the knob 31 because it will be locked by the slide bar 77. The motor knob 57, however, can be operated to energize the motor. When the shaft 56 is thus operated, it moves its flattened portion 80 into parallel relation with the adjacent end of the bar so that the bar is released, whereby the knob 31 can be moved to open the valve 29. When the motor is energized and the knob 31 has thus been operated, the knob 31 in turn locks the motor knob so that it cannot be returned to its position of Fig. 1 to deenergize the motor until the knob 31 has been returned to its position of Fig. 5.

This interlock is important because it absolutely insures the measurement of the proper quantity of liquid for the vat.

A rinsing operation can be effected by turning the motor and liquid inlet valve knobs 57 and 31 to their positions shown in Fig. 7, while permitting the drain valve to remain open. Under these conditions, water will be supplied to the vat through the reaction spray device 25 continuously as long as the knobs are permitted to remain in these positions.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent in the United States is:

1. Washing apparatus comprising a vat, power operated means for engaging liquid in said vat so as to circulate it in the vat, liquid supply valve means for said vat and interlocking means between said valve means and said power operated means preventing the operation of the latter to cease circulating liquid in said vat when said valve means is open to permit liquid to flow to said vat and preventing operation of said valve means to open until after said power means has been started to circulate liquid in said vat.

2. Washing apparatus comprising a vat, a liquid impeller in said vat, a motor for driving said impeller, a liquid supply valve for sa'd vat, means for operating said valve to its open position, means preventing the operation of said valve to its open position while said motor is idle, a latch operative each time said valve is opened to hold the valve in its open position, an electromagnet for releasing said latch to permit said valve to close at a predetermined value in the excitation of said electromagnet and means connecting said electromagnet in the circuit of said motor every time said valve is moved to its open position.

3. Dishwashing apparatus comprising a vat, a motor operated liquid distributing device in said vat, a control member for energizing and deenergizing said motor, a liquid supply valve for said vat, a second control member for said valve to move it to its open position, means for moving said valve to its closed position, an electroresponsive device controlling said latter means to effect the closure of said valve at a predetermined value in the excitation of said device, means operated by said second control member connecting said electroresponsive device in a circuit of said motor whenever the valve is opened so that said device is excited in accordance with the motor load and means preventing operation of said first control member to deenergize said motor while said liquid supply valve is open.

4. Dishwashing apparatus comprising a vat, a motor operated liquid distributing device in said vat, a control member for energizing and deenergizing said motor, an operating shaft for said control member, a liquid supply valve for said vat, a second shaft for operating said valve to move it to its open position, means for moving said valve to its closed position, an electroresponsive device controlling said latter means to effect the closure of said valve at a predetermined value in the excitation of said device, means operated by said second shaft for connecting said electroresponsive device in a circuit of said motor when said valve is opened so that said device is excited in accordance with the motor load, and interlocking means between said first and second shafts preventing operation of the second to open said liquid supply valve while said motor is deenergized and the operation of the first to deenergize said motor when said valve is in its open position.

5. Washing apparatus comprising a vat, a liquid impeller in said vat, a motor for driving said impeller, control means for said motor, a liquid supply valve for said vat, a pair of control members for said motor and valve respectively, the first control member movable independently of the second to energize said motor and the second member movable to one position to open said valve, locking means operable to hold said supply valve in its open position when the latter is moved into this position, an electromagnet for automatically releasing said locking means to permit said valve to close at a predetermined value in the excitation of said electromagnet, switching means arranged to connect said electromagnet in the circuit of said motor, means controlled by said second control member for operating said switching means to connect said electromagnet in said circuit when it is moved to said one position to open said valve, and said second control member movable to another position while the first control member is in its motor-energizing position, and operably associated with said locking means to release the locking means at will when moved to said other position so as to permit the valve to close and open said switching means to disconnect said electromagnet before said electromagnet has operated to release said locking means.

6. Dishwashing apparatus comprising a vat, a liquid circulating impeller in said vat, a driving motor for said impeller, a liquid supply valve for said vat, a control member for moving said valve to its open position, an electromagnet to effect the closing of said valve at a predetermined value in the excitation of said magnet, a switch in the motor circuit movable between a pair of controlling positions, in one of which said motor circuit is completed through said switch independent of said electromagnet and in the other of which said circuit is completed through said electromagnet and means connecting said switch to said control member so that every operation of said member to open said valve moves said switch to said other position.

7. Dishwashing apparatus comprising a vat, a liquid circulating impeller in said vat, a driving motor for said impeller, a liquid supply valve for said vat, a control member for moving said valve to its open position, means biasing said valve to its closed position, an electromagnet controlling said last named means to effect the closure of said valve at a predetermined value in the excitation of said magnet, a switch in the motor circuit movable between a pair of controlling positions, in one of which said motor circuit is completed through said switch independent of said electromagnet and in the other of which said circuit is completed through said electromagnet, and means connecting said switch to said control member so that when said valve is opened said switch is moved to said other position, and also to said biasing means so that when said valve is moved to its closed position by said biasing means said switch is moved to said one position.

8. Washing apparatus comprising a vat, a liquid circulating impeller in said vat, a liquid supply valve for said vat, a driving motor for said impeller, a control member for moving said valve to its open position, a latch for said control member for holding said valve in said open position, a shaft supporting said control member, means resiliently biasing said shaft to a normal operative position, control means for said latch operably associated with said motor to respond to the load imposed thereon to release said valve when said load attains a predetermined magnitude, and means for moving said shaft from said normal operative position to release said control member independently of said control means.

9. Washing apparatus comprising a vat adapted to contain a cleansing liquid, means for circulating said liquid in said vat, means for supplying cleansing liquid to said vat, a valve controlling said liquid supply means, means biasing said valve to its closed position, a rotatable control member for said valve operating to open said valve when rotated in one direction, means for locking said valve in its open position, means controlling said locking means responsively to a condition of operation of said liquid circulating means that varies as the load upon said circulating means varies when the quantity of liquid in said vat is changed so as to release said valve to shut off the supply of liquid in said vat when said load attains a predetermines magnitude, means mounting said control member for axial movement from its normal operating position, and said control member associated with said locking means to operate the locking means to release said valve when the control member is moved axially from said normal operating position.

10. Washing apparatus comprising a vat, a liquid supply valve for said vat, a liquid circulating device in said vat, a motor for driving said circulating device, control knobs for said valve and motor respectively, a spring member biasing said valve to its closed position, locking means to hold said valve in its open position, control means for said locking means operably associated with said motor to respond to the load imposed thereon to release said valve when said load attains a predetermined magnitude, an interlock between said control knobs preventing operation of said motor knob to deenergize said motor when said valve is open and releasing the motor knob to permit the deenergization of said motor when said valve is closed and means providing for manual release of said locking means to permit said valve to close and to thereby release said motor knob to permit operation thereof to deenergize said motor before said load attains said predetermined magnitude.

11. Washing apparatus comprising a washing vat, a liquid circulating impeller in said vat, a driving motor for said impeller, a control switch for said motor, a liquid supply valve for said vat, a control knob for said valve, locking means to hold said valve in its open position, an electromagnet arranged to move said locking means to release said valve, a switch arranged when moved to one position to connect the energizing circuit of said electromagnet in the circuit of said motor so that when the load on said motor attains a predetermined magnitude said electromagnet is excited to release said valve, a link connecting said switch to said knob so that the latter when moved to open said valve operates said switch to said one position, means resiliently mounting said knob in its normal operative position and providing for manual movement from said position, and the knob being operably associated with said locking means to effect the release of said valve independently of the operation of said magnet when the knob is moved from said position.

12. Washing apparatus comprising a vat, liquid circulating means in said vat, a driving motor for said circulating means, a liquid supply valve for said vat, means biasing said valve to its closed position, means for locking said valve in its open position, an electromagnet having an armature movable to release said locking means to permit the valve to close at a predetermined value in the excitation of said electromagnet, a spring exerting a selected force on said armature, means for varying the effect of said spring on said armature, and means connecting said electromagnet in the motor circuit so that its excitation varies as the load imposed on said motor varies.

13. Washing apparatus comprising a vat, liquid circulating means for said vat, a motor for operating said circulating means, a switching means for controlling the energization of said motor, a shaft for operating said switching means, a liquid controlling supply valve for said vat, a second shaft for operating said valve, a slide bar between said shafts, and the shafts having flattened sections opposite the ends of said bar related to the bar so that the second shaft cannot be operated to open said valve until said first shaft has been operated to energize said motor, and said first shaft cannot be operated to deenergize said motor until said second shaft has been operated to close said supply valve.

14. Washing apparatus comprising a vat, liquid circulating means for said vat, a motor for operating said circulating means, switching means controlling the energization of said motor, a shaft for operating said switching means, a liquid supply valve for said vat, a second shaft for operating said valve, a slide bar between said shafts, and the shafts having flattened sections opposite the ends of said bar related to the bar so that the second shaft cannot be operated to open said valve until said first shaft has been operated to energize said motor, and said first shaft cannot be operated to deenergize said motor until said second shaft has been operated to close said supply valve, means biasing said valve to its closed position, locking means for holding said second shaft in its position to hold the valve open, an electromagnet for releasing said locking means when energized to a predetermined degree, a second switch controlling said electromagnet so that when it is in one position it connects the electromagnet in the armature circuit of said motor and when in another position it disconnects it from said armature circuit, and link means connecting said second switch with said second shaft so that when said valve is opened said switch is moved to said one position and when the valve is closed said switch is moved to said other position.

FORREST A. WALKER.
GUSTAVE F. MAISCH.